(12) United States Patent
Katagiri et al.

(10) Patent No.: US 7,137,701 B2
(45) Date of Patent: Nov. 21, 2006

(54) STAIN-PROOFING SPECTACLE LENS AND MANUFACTURING METHOD THEREOF

(75) Inventors: Hiroshi Katagiri, Minowa-machi (JP); Keiichi Suzuki, Minowa-machi (JP); Akiko Kawase, Minowamachi (JP); Katsuyoshi Takeshita, Minowamachi (JP)

(73) Assignee: Seiko Epson Corporation, Tokyo (JP)

( * ) Notice: Subject to any disclaimer, the term of this patent is extended or adjusted under 35 U.S.C. 154(b) by 144 days.

(21) Appl. No.: 10/505,049

(22) PCT Filed: Nov. 27, 2003

(86) PCT No.: PCT/JP03/15193

§ 371 (c)(1),
(2), (4) Date: Dec. 13, 2004

(87) PCT Pub. No.: WO2004/111705

PCT Pub. Date: Dec. 23, 2004

(65) Prior Publication Data

US 2005/0168685 A1 Aug. 4, 2005

(30) Foreign Application Priority Data

Jun. 10, 2003 (JP) .............................. 2003-165563

(51) Int. Cl.
*G02C 7/02* (2006.01)

(52) U.S. Cl. ....................................... 351/159; 359/177
(58) Field of Classification Search ................ 351/159, 351/166, 177
See application file for complete search history.

(56) References Cited

U.S. PATENT DOCUMENTS

| 4,855,180 A | * | 8/1989 | Kawamura ................... 428/328 |
| 6,183,872 B1 | | 2/2001 | Tanaka et al. |
| 6,958,191 B1 | * | 10/2005 | Yamaguchi et al. ......... 428/447 |
| 7,012,160 B1 | * | 3/2006 | Hayashida et al. .......... 568/335 |

FOREIGN PATENT DOCUMENTS

| EP | 0738771 A1 | 10/1996 |
| EP | 0844265 A1 | 5/1998 |
| EP | 1389634 | 2/2004 |
| JP | 09-202648 A | 8/1997 |
| JP | 9-258003 A | 10/1997 |
| JP | 11-258405 A | 9/1999 |
| JP | 2000-029631 A | 1/2000 |
| JP | 2000-282009 A | 10/2000 |
| JP | 2002-220122 A | 8/2002 |
| JP | 2002-268256 A | 9/2002 |
| JP | 2002-296101 A | 10/2002 |
| JP | 2003-121606 | 4/2003 |
| WO | 02/077116 A1 | 10/2002 |

* cited by examiner

*Primary Examiner*—Scott J. Sugarman
(74) *Attorney, Agent, or Firm*—Sughrue Mion, PLLC

(57) ABSTRACT

A spectacle lens that can lower the slipperiness of a lens surface to an extent that allows an edging process by making without deteriorating the stain-proofing performance of the stain-proofing layer, when a stain-proofing layer is formed of two or more kinds of silane compounds including at least one or more kinds of fluorine-containing silane compounds, and as for the dynamic friction coefficient of lens surfaces defined by each of the two or more kinds of silane compounds as a single component, the highest value of the dynamic friction coefficients 1.4 times or more of the lowest value of the dynamic friction coefficients; and a manufacturing method thereof are provided.

8 Claims, 2 Drawing Sheets

F I G. 2
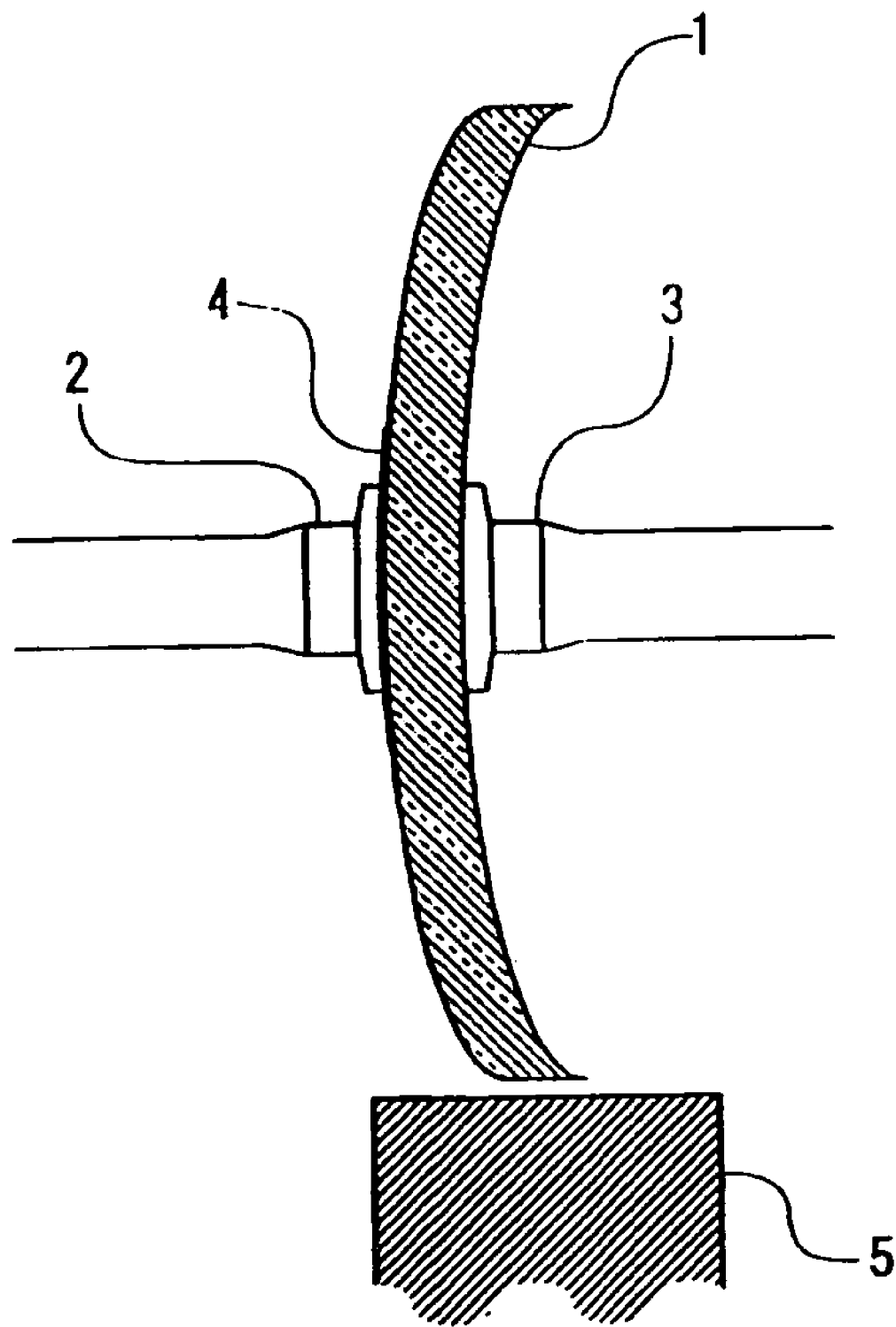

STAIN-PROOFING SPECTACLE LENS AND MANUFACTURING METHOD THEREOF

TECHNICAL FIELD

The present invention relates to a stain-proofing spectacle lens that can inhibit a spectacle lens, to which stain-proofing treatment is applied, from slipping when an edging process is applied and thereby can improve the processing accuracy without deteriorating excellent stain-proofing performance, and a manufacturing method thereof.

BACKGROUND ART

In a spectacle lens, normally, in order to suppress light from being reflected and thereby to improve the light transmittance, an anti-reflection coating is formed on a surface thereof. However, when the lens is used, there are problems in that stains due to adhesion of dirt from hand, fingerprint, sweat, cosmetics and so on tend to stand out and furthermore these stains are difficult to remove. Accordingly, in order to make the lens difficult to be stained or to make stains easier to be wiped off, on a surface of the anti-reflection coating, a stain-proofing layer is further disposed. A method in which surface treatment is applied with a fluorine-containing silane compound that is a surface treatment agent for providing a stain-proofing layer to the spectacle lens is disclosed as a prior art in, for instance, JP-A No.9-258003.

However, the spectacle lens that is surface-treated with a fluorine-containing silane compound in JP-A No.9-258003, being remarkably small in the friction coefficient in comparison with a conventional surface treatment agent, is very slippery in its surface. Accordingly, there are problems such as follows. That is, at retailer's shops of the spectacles, a so-called edging process, by which a circular spectacle lens is polished into a shape that can be accommodated in a spectacle frame, is performed. In the edging process, while holding a spectacle lens by a friction force in a method in which an optical center of a spectacle lens is sucked and held by a chuck of an edging machine or a method in which the spectacle lens is clipped from both sides by pressing, an edge of the spectacle lens is ground with a grinding stone. During the edging process, the spectacle lens that is surface-treated with a fluorine-containing silane compound in JP-A No.9-258003 is slippery in the lens surface held by the chuck; accordingly, during the grinding with the grinding stone, owing to the grinding pressure of the grinding stone, axis deviation, where a center of the lens deviates from a center of the chuck, is caused, resulting in incapability of accurately applying the edging process.

Accordingly, the spectacle lenses, to which the stain-proofing process is applied with the fluorine-containing silane compound that is excellent in the stain-proofing effect, are edged in production plants while paying attention not to cause the axis deviation. However, for spectacle lenses that are necessary to be edged at retailer's shops, in order that an accurate edging process may be applied at the retailer's shops, ones that are lowered in the surface slipperiness by processing by less-effective stain-proofing treatment are supplied to secure the holding of the spectacle lens.

The present invention was carried out in view of the above situations and intends to provide a spectacle lens that can be lowered in the surface slipperiness of a lens surface to an extent that allows applying the edging process without deteriorating excellent stain-proofing effect of a stain-proofing layer, and a manufacturing method thereof.

DISCLOSURE OF INVENTION

The present inventors studied hard to achieve the above objects and resultantly found that when a stain-proofing layer is formed of two or more kinds of silane compounds that are selected so as to be different in the dynamic friction coefficient of the lens surface after the treatment and at least one or more kinds of which are fluorine-containing silane compounds, the slipperiness of a lens surface can be reduced to an extent that allows applying the edging process without deteriorating the stain-proofing effect intrinsic to the fluorine-containing compound.

Furthermore, since there is a problem that stains on an anti-reflection coating disposed on a surface of a spectacle lens tend to stand out and are difficult to remove, forming of a stain-proofing layer is effective.

Accordingly, a firstly described invention provides a stain-proofing spectacle lens characterized in that, on a surface of a spectacle lens, a stain-proofing layer is formed of two or more kinds of silane compounds including at least one or more kinds of fluorine-containing silane compounds, and as for the dynamic friction coefficients of lens surfaces, separately defined by each of the two or more kinds of silane compounds, the highest dynamic friction coefficient is 1.4 times or more that of the lowest one.

A second invention provides a stain-proofing spectacle lens characterized in that, in the stain-proofing spectacle lens according to claim 1, out of two or more kinds of the silane compounds, a content of a silane compound, with which a surface having the lowest dynamic friction coefficient can be obtained, is in the range of 30 to 99% relative to a total amount of silane compounds.

A third invention provides a stain-proofing spectacle lens characterized in that, in the stain-proofing spectacle lens according to claim 1, the dynamic friction coefficient of a lens surface, defined by a silane compound that can obtain the surface having the lowest dynamic friction coefficient, out of the two or more kinds of silane compounds, is 0.2 or less.

A fourth invention provides a stain-proofing spectacle lens characterized in that, in the stain-proofing spectacle lens according to the first invention, out of the two or more kinds of silane compounds, at least one kind thereof is expressed with a general formula (1) below.

[Formula 2]

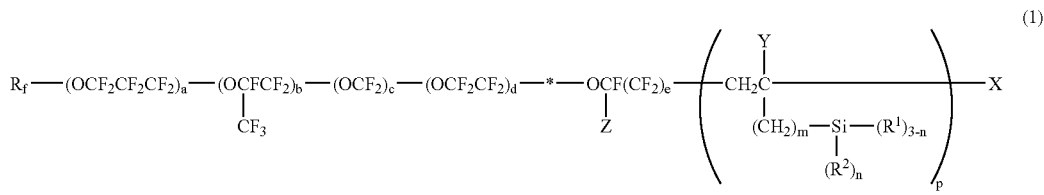

(1)

(In the formula, $R_f$ expresses a straight chain or a branched chain of perfluoroalkyl group having 1 to 16 carbon atoms; X, an iodine or a hydrogen atom; Y, a hydrogen atom or a lower alkyl group; Z, a fluorine atom or a trifluoromethyl group; $R^1$, a hydrolizable group; $R^2$, a hydrogen atom or an inactive monovalent organic group; a, b, c and d, an integer of 0 to 200; e, 0 or 1; m and n, an integer of 0 to 2; and p, an integer of 1 to 10.).

A fifth invention provides a stain-proofing spectacle lens characterized in that, in the stain-proofing spectacle lens described in any one of the first through fourth inventions, an anti-reflection coating is formed in a lower layer of a stain-proofing layer of the stain-proofing spectacle lens.

A sixth invention provides a method of manufacturing a stain-proofing spectacle lens including a step of forming an anti-reflection coating on a surface of lens base material on which a hard coat film may be formed, and a step of forming a stain-proofing layer from two or more kinds of silane compounds, at least one or more kinds of which are fluorine-containing silane compounds, on the antireflection coating; wherein, in the dynamic friction coefficients of lens surfaces, defined separately by each of two or more kinds of silane compounds, the highest value of the dynamic friction coefficient is 1.4 times or more of the lowest value.

A seventh invention provides a method of manufacturing a stain-proofing spectacle lens, in which a treatment agent containing two or more kinds of the silane compounds is coated on a lens surface in the step of forming a stain-proofing layer from two or more kinds of silane compounds including at least one or more kinds of fluorine-containing silane compounds on the antireflection coating in the method of manufacturing a stain-proofing spectacle lens according to the sixth invention.

An eighth invention provides a method of manufacturing a stain-proofing spectacle lens in which two kinds or more of the silane compounds are evaporated in a vacuum chamber and deposited on a lens surface in the step of forming a stain-proofing layer from two or more kinds of silane compounds including at least one kind or more of fluorine-containing silane compounds on the antireflection coating in the method of manufacturing a stain-proofing spectacle lens according to the sixth invention.

BRIEF DESCRIPTION OF THE DRAWINGS

FIG. 2 is a side view showing an example of a chuck that holds a lens of an edging machine.

BEST MODE FOR CARRYING OUT THE INVENTION

Figure 1:
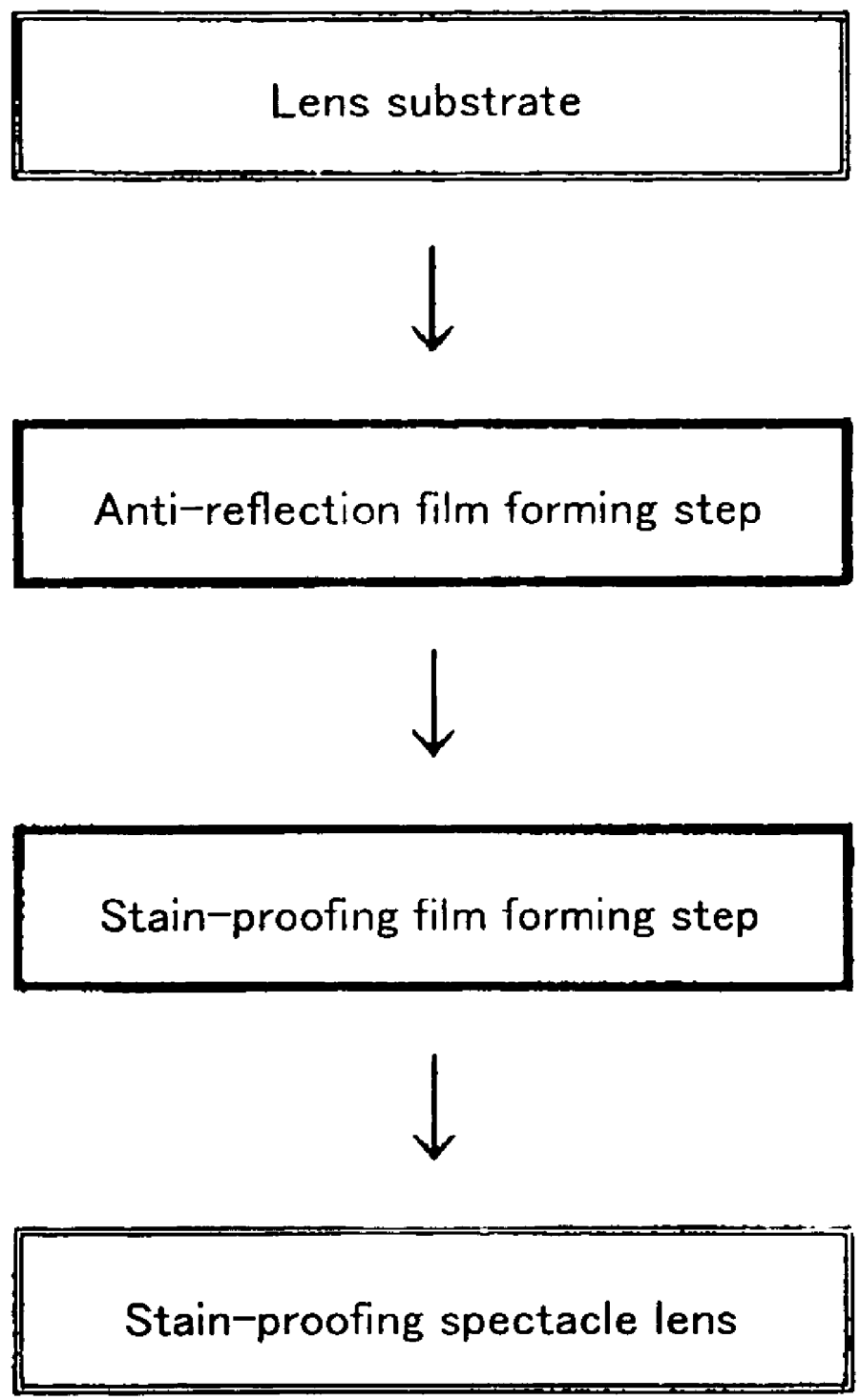
FIG. 1 is a manufacturing process diagram of a stain-proofing spectacle lens.

Hereinafter, embodiments of a stain-proofing spectacle lens according to the present invention and a manufacturing method thereof will be explained; however, the present invention is not restricted to the embodiments below. As mentioned above, The stain-proofing spectacle lens according to the invention can be obtained by forming a stain-proofing layer from two or more kinds of silane compounds that are selected so as to be different in the dynamic friction coefficient of a lens surface after the treatment and at least one or more kinds of which are fluorine-containing silane compounds.

As for base materials of the spectacle lens, either one of inorganic glass and plastics can be used. As for the plastics, diethylene glycol bisallyl carbonate (CR-39), polyurethane resin, thiourethane resin, polycarbonate resin and acrylic resin can be cited.

In the case of a glass lens, a stain-proofing layer can be directly formed on the glass lens; however, normally, the stain-proofing layer is preferably disposed after an anti-reflection coating is applied in the case of the glass lens, and the stain-proofing layer is preferably disposed after a hard coat film and an anti-reflection coating are applied in the case of plastic lens.

The hard coat film endows the plastic lens with the scratch resistance; in addition to the above, since the adhesiveness of the anti-reflection coating to the plastic lens is not good in general, the hard coat film is interposed between the plastic lens and the anti-reflection coating to improve the adhesiveness of the antireflection coating and thereby to inhibit the anti-reflection coating from peeling off.

As for a method of forming a hard coat film, a method of coating a curable composition that can form a hard coat film on a surface of the plastic lens, and curing a coated film is generally used. In the case of the plastic lens being a thermoplastic resin, one that can be cured by electromagnetic waves such as UV light and ionizing radiation such as electron beams can be used more preferably than a thermosetting type. For instance, a photo-curable silicone compound mainly made of a silicone compound that generates a silanol group by UV light irradiation, and organo-polysiloxane having a halogen atom or a reactive group such as an amino group that causes a condensation reaction with the silanol group; an acrylic UV-curable monomer composition such as UK-6074 manufactured by Mitsubishi Rayon Co., Ltd.; and a fine inorganic particles-containing thermosetting composition, in which fine inorganic particles such as $SiO_2$ and $TiO_2$ having a particle diameter in the range of 1 to 100 nm are dispersed in a silane compound or a silane-coupling agent that has a polymerizing group such as a vinyl group, an allyl group, an acrylic group or a methacrylic group and a hydrolyzing group such as a methoxy group, can be cited.

As for a method of forming a coating, a dipping method, a spin-coat method, a spray coating method, a float method and a doctor blade method can be adopted.

Prior to the formation of the coating, in order to improve the adhesiveness, a surface of the plastic lens is preferably surface-treated by means of corona discharge, high voltage discharge of microwaves and so on.

When a formed coating is cured by means of heat, UV light, electron beam and so on, a hard coat film can be obtained.

A film thickness of the hard coat film is preferably in the range of substantially 0.05 to 30 µm. When the film thickness is excessively thin, the fundamental performance cannot be exhibited in some cases; on the other hand, when it is excessively thick, optical distortion may be caused in some cases.

The anti-reflection coating is constituted of a single layer or a multi-layer of inorganic coating or organic coating. As for materials of the inorganic coating, inorganic substances such as $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$ and $WO_3$ can be cited. These can be used singly or in combinations of two or more kinds. In the case of the plastic lens, $SiO_2$, $ZrO_2$, $TiO_2$ and $Ta_2O_5$ that can be vacuum-vaporized at low temperatures are preferable. Furthermore, in the case of the anti-reflection coating being formed into a multi-layered structure, the outermost layer is preferably formed of $SiO_2$.

As a multi-layered film of inorganic coatings, a four layered structure having, from the lens side, a $ZrO_2$ layer and a SiO$_2$ layer having a total optical film thickness of λ/4, a ZrO$_2$ layer having an optical film thickness of λ/4 and a SiO$_2$ layer at the uppermost having a total optical film thickness of λ/4 can be cited. Here, λ is a design wavelength and normally 520 nm is used.

As for a deposition method of the inorganic coating, for instance, a vacuum deposition method, an ion plating method, a sputtering method, a CVD method and a precipitation method by a chemical reaction in a saturated solution can be adopted.

A material of the organic coating is selected in considering the refractive indices of the plastic lens and the hard coat film, and other than the vacuum deposition method, coating methods excellent in the mass production capability such as a spin coat method and a dip coat method can be used to form.

different in the dynamic friction coefficient of the lens surface after the treatment and at least one or more kinds of which are fluorine-containing silane compounds, a spectacle lens having the desired stain-proofing properties can be obtained.

The two or more kinds of silane compounds that form a stain-proofing layer and including at least one or more kinds of fluorine-containing silane compounds, are selected so that the dynamic friction coefficients of lens surfaces, formed with each of the two or more kinds of silane compounds as a single component, may be different each other, and among these, as one that can obtain a lens surface having a relatively low dynamic friction coefficient, a fluorine-containing silane compound that is expressed by a general formula (1) described below and proposed in, for instance, JP-A No.9-258003 can be preferably used.

[Formula 3]

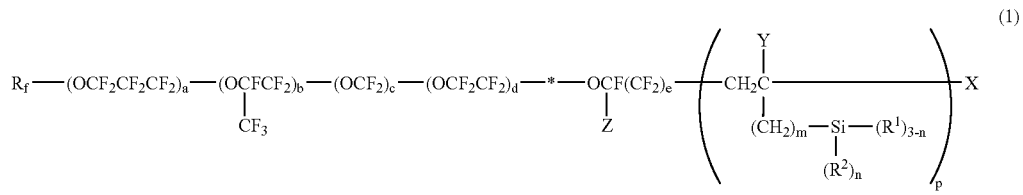

In a stain-proofing spectacle lens according to the invention, on the outermost surface of the spectacle lens, that is, on the above-mentioned hard coat film or deposition film, a stain-proofing layer is formed, and the stain-proofing layer can be obtained by forming from two or more kinds of silane compounds that are selected so as to be different in the dynamic friction coefficient of the lens surface after the treatment and include at least one or more kinds of fluorine-containing silane compounds.

By including a fluorine group, the stain-proofing layer, is formed by treating a spectacle lens surface with a fluorine-containing silane compound, develops excellent water repellency and oil repellency, and has stain-proofing characteristics intrinsic to the stain-proofing layer, that is, performances such as that the contamination preventive properties are excellent, the effect thereof can continue, and the contamination can be easily removed. On the other hand. Because the surface slipperiness is so significant, when applying an edging process to a spectacle lens by mounting the spectacle lens on the chuck of the edging machine, the polishing pressure of the grinding stone that grinds becomes overcome the frictionally holding force of the chuck, and in some cases resulting in causing the axis deviation of the spectacle lens during the edging process. As for the chuck of the edging machine, there is a method in which a horn-shaped rubber sucking part sucks and holds a spectacle lens and a method in which a spectacle lens is pressed from both sides thereof and held.

In order to eliminate the axis deviation, it is necessary to reduce only the surface slipperiness to an extent that can make the frictionally holding force of the chuck of the edging machine larger than the polishing pressure of the grinding stone without adversely affecting on the stain-proofing effect intrinsic to the stain-proofing layer; when a stain-proofing layer is formed of two or more kinds of silane compounds that are selected, as treatment agents that are used in the formation of the stain-proofing layer, so as to be In the general formula (1), R$_f$ expresses a straight chain or a branched chain perfluoroalkyl group having 1 to 16 carbon atoms and preferably CF$_3$—, C$_2$F$_5$— and C$_3$F$_7$—. R$^1$ expresses a hydrolizable group and preferably, for instance, a halogen atom, —OR$^3$, —OCOR$^3$, —OC(R$^3$)=C(R$^4$)2, —ON=C(R$^3$)$_2$, and —ON=CR$^5$. More preferable ones are a chlorine atom, —OCH$_3$ and —OC$_2$H$_5$. Here, R$^3$ expresses an aliphatic hydrocarbon group or an aromatic hydrocarbon group; R$^4$, a hydrogen atom or a lower aliphatic hydrocarbon group; and R$^5$, a divalent aliphatic hydrocarbon group having 3 to 6 carbon atoms. R$^2$ expresses a hydrogen atom or an inactive mono-valent organic group and preferably a monovalent hydrocarbon group having 1 to 4 carbon atoms. Each of a, b, c and d expresses an integer of 0 to 200 and preferably 1 to 50, and e is 0 or 1. Each of m and n expresses an integer of 0 to 2 and preferably 0. P is an integer of 1 or more and preferably an integer of 1 to 10. Furthermore, a molecular weight is in the range of $5 \times 10^2$ to $1 \times 10^5$ and preferably $5 \times 10^2$ to $1 \times 10^4$.

Still furthermore, as one having a preferable structure of the fluorine-containing silane compounds that are expressed by the general formula (1), ones expressed by a general formula (2) below can be cited.

[Formula 4]

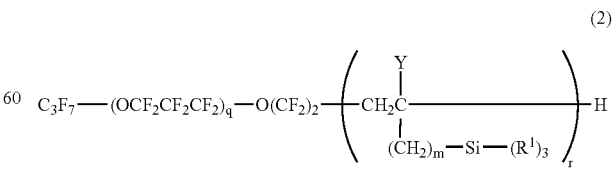

In the formula, Y expresses a hydrogen atom or a lower alkyl group; R$^1$, a hydrolizable group; q, an integer of 1 to 50; m, an integer of 0 to 2; and r, an integer of 1 to 10.

Furthermore, as a trade name, for instance, OPTOOL DSX, manufactured by Daikin Industries, Ltd. and KY-130, manufactured by Shin-Etsu Chemical Co., Ltd. can be cited.

Subsequently, silane compounds that can obtain a lens surface having a relatively high dynamic friction coefficient include such as 3,3,3-trifluoropropyltrimethoxysilane, tridecafluorooctyltrimethoxysilane, heptadecafluorodecyltrimethoxysilane, n-trifluoro (1,1,2,2-tetrahydro) propyl silazane, n-heptafluoro (1,1,2,2-tetrahydro) pentyl silazane, n-nonafluoro (1,1,2,2-tetrahydro) hexyl silazane, n-tridecafluoro (1,1,2,2-tetrahydro) octyl silazane, n-heptadecafluoro (1,1,2,2-tetrahydro) decyl silazane, octadecyltriethoxysilane, octadecyltrimethoxysilane, phenyltriethoxysilane, phenyltrimethoxysilane, heptylmethyldichlorosilane, isobutyltrichlorosilane, octadecylmethyldimethoxysilane and hexamethyldisilazane.

Furthermore, trade names such as KP-801, LS-1090, LS-4875, LS-4480, LS-2750, LS-1640, LS-410, and LS-7150, manufactured by Shin-Etsu Chemical Co., Ltd. and TSL-8257, TSL-8233, TSL-8185, TSL-8186, TSL-8183 and XC95-A9715, manufactured by GE Toshiba Silicones Co., Ltd. can be cited.

Among these silane compounds, silane compounds are preferably selected so that in values of the dynamic friction coefficient, the highest value of the dynamic friction coefficients may be 1.4 times or more of the lowest value and more preferably 1.8 times or more. By thus implementing, without deteriorating the excellent stain-proofing properties, the surface slipperiness of the lens can be lowered to an extent that allows applying edging process.

When the ratio of the highest value of the dynamic friction coefficient to the lowest value thereof is less than 1.4, the excellent stain-proofing properties can be exhibited; however, since the slipperiness of the lens surface is large, the axis deviation may be unfavorably caused.

Furthermore, in order to secure the excellent stain-proofing performance, among two or more kinds of silane compounds including at least one or more kinds of fluorine-containing silane compounds, a content of a silane compound, which can obtain a surface having a lowest dynamic friction coefficient, is preferably set in the range of 30 to 99% by weight of a total amount of silane compounds and more preferably in the range of 50 to 98% by weight. When a content of a silane compound, which can obtain a surface having a lowest dynamic friction coefficient, is less than 30% by weight relative to a total amount of the silane compounds, the stain-proofing performance is unfavorably deteriorated even though the axis deviation is not caused. On the contrary, when the content thereof exceeds 99% by weight of a total amount of silane compounds, the axis deviation is unfavorably likely to be caused.

A value of the dynamic friction coefficient of a lens surface formed with a silane compound as a single component, which can obtain a surface having a lowest dynamic friction coefficient, is preferably 0.2 or less and more preferably 0.15 or less. When the value of the dynamic friction coefficient of the lens surface exceeds 0.2, the stain-proofing performance is unfavorably deteriorated.

Although not particularly restricted, as shown in a manufacturing process diagram of FIG. 1, a method of forming a stain-proofing layer includes a step of forming a stain-proofing layer from two or more kinds of silane compounds including at least one or more kinds of fluorine-containing silane compounds.

In forming a stain-proofing layer with two or more kinds of silane compounds-including at least one or more kinds of fluorine-containing silane compounds, on a spectacle lens by means of coating, a method of coating silane compounds, dissolved in an organic solvent, on a surface of the spectacle lens can be adopted. As a coating method, a dipping method, a spin coat, a spray method, a flow method, a doctor-blade method, a roll coat method, a gravure coat method and a curtain flow coat method can be used. As an organic solvent, perfluorohexane, perfluorocyclobutane, perfluorooctane, perfluorodecane, perfluoromethylcyclohexane, perfluoro-1,3-dimethylcyclohexane, perfluoro-4-methoxybutane, perfluoro-4-ethoxybutane and metaxylene hexafluoride can be cited. Furthermore, perfluoroether oil and chlorotrifluoroethylene oligomer oil can be used. Other than these, chlorofluorocarbon 225 (a mixture of $CF_3CF_2CHCl_2$ and $CClF_2CF_2CHClF$) can be cited. These organic solvents can be used singly or in combinations of two or more kinds.

A concentration at diluting with an organic solvent is preferably in the range of 0.03 to 1% by weight. When the concentration is excessively low, a stain-proofing layer having a sufficient thickness can be hardly obtained, resulting in, in some cases, being incapable of obtaining sufficient stain-proofing effect; on the other hand, when the concentration is excessively high, since the stain-proofing layer is likely to be formed excessively thick, it is likely that burden of rinsing process for removing irregularity after coating increases.

The stain-proofing layer according to the invention reacts at normal temperature and is fixed on a lens surface; however, as needs arise, it is preferably held under a high temperature and high humidity environment to complete the reaction more completely.

As a method of coating silane compounds, a vacuum deposition method where the silane compounds are evaporated in a vacuum chamber to deposit on a surface of a spectacle lens can be adopted. In the case of an anti-reflection coating being formed on a lens surface by means of the vacuum deposition method, the stain-proofing layer is preferably formed successively without exposing the lens to air at once. In the vacuum deposition method, a raw material compound can be used at a high concentration or without a diluting agent.

Although not particularly restricted, a thickness of the stain-proofing layer is in the range of 0.001 to 0.5 μm and preferably in the range of 0.001 to 0.03 μm. When the thickness of the stain-proofing layer is excessively thin, the stain-proofing effect becomes unfavorably less; on the other hand, when it is excessively thick, a surface thereof becomes unfavorably sticky. Furthermore, in the case of the stain-proofing layer being formed on a surface of the anti-reflection coating, when the thickness of the stain-proofing layer is thicker than 0.03 μm, the anti-reflection effect is unfavorably deteriorated.

After the stain-proofing layer is formed, treatment for removing unreacted molecules and molecules whose reaction has not come to completion may be applied. For instance, an organic solvent that can dissolve the silane compounds can be applied for the treatment or an alkaline-aqueous solution can be used to for the treatment.

As for an organic solvent, organic compounds having a perfluoro group, excellent in the solubility of the silane compounds, and having 4 or more carbon atoms, are preferable. For instance, perfluorohexane, perfluorocyclobutane, perfluorooctane, perfluorodecane, perfluoromethylcyclohexane, perfluoro-1,3-dimethylcyclohexane, perfluoro-4-methoxybutane, perfluoro-4-ethoxybutane and metaxylene hexafluoride can be cited. Furthermore, perfluoroether oil and chlorotrifluoroethylene oligomer oil can be used. Other than these, chlorofluorocarbon 225 (a mixture of $CF_3CF_2CHCl_2$ and $CClF_2CF_2CHClF$) can be cited. These organic solvents can be used singly or in combinations of two or more-kinds.

An alkaline aqueous solution is preferably 9 or more in the pH. As for an alkali source, sodium hydroxide, potassium hydroxide, sodium carbonate, potassium carbonate and so on can be cited. In the alkaline aqueous solution, a surfactant can be added to improve the cleaning effect. As a surfactant that is added to the alkaline aqueous solution, without particularly restricting, anionic surfactants, cationic surfactants, nonionic surfactants and amphoteric surfactants, silicone base surfactants and fluorine base surfactants can be used. Furthermore, when in the case of alkali soap or the like being used, and the pH of 9 or more can be obtained by the addition of the surfactant component alone, the alkali source has not to be used.

As for specific examples for anionic surfactants, aliphatic acid salts, alkyl sulfates, alkylbenzene sulfonates, alkyl phosphates and polyoxyethylene alkyl sulfate esters can be cited; as for cationic surfactants, alkylammonium salts and alkylamine salts can be cited; and as for nonionic surfactants, polyoxyethylene alkyl ether, polyoxyethylene aliphatic acid ester, oxyethylene-oxypropylene block copolymer and glycerin aliphatic acid ester can be cited.

Other than the organic solvents and the alkaline aqueous solution, a fluorine base surfactant having, for instance, a perfluoro group, also can be used as a direct treatment agent or a surfactant added to an organic solvent or an alkaline aqueous solution. As for the fluorine base surfactant, perfluoroalkyl ($C_7$ to $C_{20}$) carboxylic acids, perfluoroalkyl ($C_4$ to $C_{12}$) sulfonic acids and so on can be cited.

As a method of treating a stain-proofing layer with these agents, a method of wiping and cleaning with paper or cloth impregnated with an agent or a method of dipping in a bottle (cleaning vessel) containing an agents, followed by oscillating or applying physical energy such as ultrasonic wave, can be applied.

Embodiments according to the present application and comparative examples will be detailed below.

(Embodiment 1)

In a fluorine base solvent (trade name Novec HFE-7200, manufactured by Sumitomo 3M Co.), 0.186% by concentration of solid component of a silane compound A (trade name KY-130, manufactured by Shin-Etsu Chemical Co., Ltd.) that gives the dynamic friction coefficient of a lens surface of 0.07 when applied thereon as a single component, and 0.014% by concentration of solid component of a silane compound B (trade name KP-801, manufactured by Shin-Etsu Chemical Co., Ltd.) that gives the dynamic friction coefficient of a lens surface of 0.34 when applied thereon as a single component, were diluted, and thereby a solution of 0.2% by concentration of solid content was prepared as a treatment solution for Dip.

A ratio of the dynamic friction coefficients of the silane compound A and the silane compound B ((the highest value of dynamic friction coefficient)/(the lowest value of dynamic friction coefficient)) was 4.9.

As for a lens material, a plastic spectacle lens having a layer of hard coat film and an anti-reflection coating (the outermost layer is a $SiO_2$ film) (Seiko Super Soverein, manufactured by Seiko Epson Corporation) was prepared and plasma treatment was applied to cleanse a surface thereof. The plasma treatment was carried out under the conditions of treatment pressure: 0.1 Torr, introduced gas: dry air, a distance between electrodes: 24 cm, output power: DC 1 KV, and a treatment time period: 15 sec.

A plasma-treated lens was immersed in the Dip treatment solution and held for 1 min, followed by pulling up at 40 cm/min, further followed by putting in a constant temperature and constant humidity chamber set at 60 degree centigrade and 60% RH and holding there for 2 hr, and thereby a stain-proofing layer was formed.

(Embodiment 2)

In a fluorine base solvent (trade name Novec HFE-7200, manufactured by Sumitomo 3M Co.), 0.1% by concentration of solid component of a silane compound A (trade name KY-130, manufactured by Shin-Etsu Chemical Co., Ltd.) that gives the dynamic friction coefficient of a lens surface of 0.07 when applied thereon as a single component, and 0.1% by concentration of solid component of a silane compound B (trade name KP-801, manufactured by Shin-Etsu Chemical Co., Ltd.) that gives the dynamic friction coefficient of a lens surface of 0.34 when applied thereon as a single component, were diluted, and thereby a solution of 0.2% by concentration of solid content was prepared as a treatment solution for Dip.

A ratio of the dynamic friction coefficients of the silane compound A and the silane compound B ((the highest value of dynamic friction coefficient)/(the lowest value of dynamic friction coefficient)) was 4.9.

As for a lens material, a plastic spectacle lens having a layer of hard coat film and an antireflection coating (the outermost layer is a $SiO_2$ film) (Seiko Super Soverein, manufactured by Seiko Epson Corporation) was prepared and plasma treatment was applied to cleanse a surface thereof. The plasma treatment was carried out under the conditions of treatment pressure: 0.1 Torr, introduced gas: dry air, a distance between electrodes: 24 cm, output power: DC 1 KV, and a treatment time period: 15 sec.

A plasma-treated lens was immersed in the Dip treatment solution and held there for 1 min, followed by pulling up at 40 cm/min, further followed by putting in a constant temperature and constant humidity chamber set at 60 degree centigrade and 60% RH and holding there for 2 hr, and thereby a stain-proofing layer was formed.

(Embodiment 3)

In perfluorohexane, 0.19% by concentration of solid component of a silane compound C (trade name Optool DSX, manufactured by Daikin Industries Ltd.) that gives the dynamic friction coefficient of a lens surface of 0.09 when applied thereon as a single component, and 0.01% by concentration of solid component of a silane compound B (trade name KP-801, manufactured by Shin-Etsu Chemical Co., Ltd.) that gives the dynamic friction coefficient of a lens surface of 0.34 when applied thereon as a single component, were diluted, and thereby a solution of 0.2% by concentration of solid content was prepared as a treatment solution for Dip.

A ratio of the dynamic friction coefficients of the silane compound C and the silane compound B ((the highest value of dynamic friction coefficient)/(the lowest value of dynamic friction coefficient)) was 3.8.

As for a lens material, a plastic spectacle lens having a layer of hard coat film and an anti-reflection coating (the outermost layer is a $SiO_2$ film) (Seiko Super Soverein, manufactured by Seiko Epson Corporation) was prepared and plasma treatment was applied to cleanse a surface thereof. The plasma treatment was carried out under the conditions of treatment pressure: 0.1 Torr, introduced gas: dry air, a distance between electrodes: 24 cm, output power: DC 1 KV, and a treatment time period: 15 sec.

A plasma-treated lens was immersed in the Dip treatment solution and held there for 1 min, followed by pulling up at 40 cm/min, further followed by putting in a constant temperature and constant humidity chamber set at 60-degree centigrade and 60% RH and holding there for 2 hr, and thereby a stain-proofing layer was formed.

(Embodiment 4)

In a mixture of perfluorohexane and a fluorine base solvent (trade name Novec HFE-7200, manufactured by Sumitomo 3M Co.) mixed at a weight ratio of 1/1, 0.19% by concentration of solid component of a silane compound C (trade name Optool DSX, manufactured by Daikin Industries Ltd.) that gives the dynamic friction coefficient of a lens surface of 0.09 when applied thereon as a single component, and 0.01% by concentration of solid component of a silane compound D (trade name TSL-8185, manufactured by GE Toshiba Silicones Co., Ltd.) that gives the dynamic friction coefficient of a lens surface of 0.48 when applied thereon as a single component, were diluted, and thereby a solution of 0.2% by concentration of solid content was prepared as a treatment solution for Dip.

A ratio of the dynamic friction coefficients of the silane compound C and the silane compound D ((the highest value of dynamic friction coefficient)/(the lowest value of dynamic friction coefficient)) was 5.3.

As for a lens material, a plastic spectacle lens with a layer of hard coat film and an anti-reflection coating (the outermost layer is a $SiO_2$ film) (Seiko Super Soverein, manufactured by Seiko Epson Corporation) was prepared and plasma treatment was applied to cleanse a surface thereof. The plasma treatment was carried out under the conditions of treatment pressure: 0.1 Torr, introduced gas: dry air, a distance between electrodes: 24 cm, output power: DC 1 KV, and a treatment time period: 15 sec.

A plasma-treated lens was immersed in the Dip treatment solution and held there for 1 min, followed by pulling up at 40 cm/min, further followed by putting in a constant temperature and constant humidity chamber set at 60 degree centigrade and 60% RH and holding there for 2 hr, and thereby a stain-proofing layer was formed.

After taking out of the constant temperature and constant humidity chamber, and followed by cooling, the lens was attached to a lens fixing jig and immersed in a ultrasonic washing tank filled with perfluorohexane, and the ultrasonic waves were applied to cleanse. Conditions of the ultrasonic washing were bath capacity: 2.6 liter, oscillation frequency: 38 kHz, output power: 120 W and treating time period: 30 sec.

(Embodiment 5)

In a mixture of perfluorohexane and a fluorine base solvent (trade name Novec HFE-7200, manufactured by Sumitomo 3M Co.) mixed at a weight ratio of 1/1, 0.18% by concentration of solid component of a silane compound C (trade name Optool DSX, manufactured by Daikin Industries Ltd.) that gives the dynamic friction coefficient of a lens surface of 0.09 when applied thereon as a single component, 0.01% by concentration of solid component of a silane compound B (trade name KP-801, manufactured by Shin-Etsu Chemical Co., Ltd.) that gives the dynamic friction coefficient of a lens surface of 0.34 when applied thereon as a single component, and 0.01% by concentration of solid component of a silane compound D (trade name TSL-8185, manufactured by GE Toshiba Silicones Co., Ltd.) that gives the dynamic friction coefficient of a lens surface of 0.48 when applied thereon as a single component, were diluted, and thereby a solution of 0.2% by concentration of solid content was prepared as a treatment solution for Dip.

A ratio of the dynamic friction coefficients of the silane compound D and the silane compound C ((the highest value of dynamic friction coefficient)/(the lowest value of dynamic friction coefficient)) was 5.3.

As for a lens material, a plastic spectacle lens having a layer of hard coat film and an antireflection coating (the outermost layer is a $SiO_2$ film) (Seiko Super Soverein, manufactured by Seiko Epson Corporation) was prepared and plasma treatment was applied to cleanse a surface thereof. The plasma treatment was carried out under the conditions of treatment pressure: 0.1 Torr, introduced gas: dry air, a distance between electrodes: 24 cm, output power: DC 1 KV, and a treatment time period: 15 sec.

After taking out of the constant temperature and constant humidity chamber, and followed by cooling, the lens was repeatedly wiped to cleanse with perfluorohexane impregnated-wipe paper (trade name Dusper, manufactured by Ozu Co. Ltd.) until coating unevenness that appears when breath was puffed upon the lens disappeared.

(Embodiment 6)

With a vacuum deposition method, on a surface of a plastic spectacle lens (Seiko Super Soverein, manufactured by Seiko Epson Corporation), a stain-proofing layer was formed according to a procedure below.

In a fluorine base solvent (trade name Novec HFE-7200, manufactured by Sumitomo 3M Co.), 1.86% by concentration of solid component of a silane compound A (trade name KY-130, manufactured by Shin-Etsu Chemical Co., Ltd.) that gives the dynamic friction coefficient of a lens surface of 0.07 when applied thereon as a single component, and 0.14% by concentration of solid component of a silane compound B (trade name KP-801, manufactured by Shin-Etsu Chemical Co., Ltd.) that gives the dynamic friction coefficient of a lens surface of 0.34 when applied thereon as a single component, were diluted, thereby a solution of 2% by concentration of solid content was prepared, and porous ceramic pellets were impregnated with 1 g of this solution.

A ratio of the dynamic friction coefficients of the silane compound A and the silane compound B ((the highest value of dynamic friction coefficient)/(the lowest value of dynamic friction coefficient)) was 4.9.

After drying, the pellets were set in a vacuum deposition unit and the unit was evacuated until a pressure of 2 to 3 Pa was attained.

In the next place, in the vacuum deposition unit, a plastic spectacle lens having a layer of hard coat film and an anti-reflection coating (Seiko Super Soverein, manufactured by Seiko Epson Corporation) was introduced and the pellets were heated to 400 to 500 degree centigrade to evaporate the silane compounds and thereby to deposit it on a lens surface. At this time, the pellets were heated by means of a halogen lamp and a deposition time period was set at 7 min. After the deposition, the inside of the deposition unit was gradually returned to an atmospheric pressure and the lens was taken out, followed by putting in a constant temperature and constant humidity chamber set at 60 degree centigrade and 60% RH and by holding there for 2 hr, and thereby a stain-proofing layer was formed.

COMPARATIVE EXAMPLE 1

In a fluorine base solvent (trade name Novec HFE-7200, manufactured by Sumitomo 3M Co.), a silane compound A (trade name KY-130, manufactured by Shin-Etsu Chemical Co., Ltd.) that gives the dynamic friction coefficient of a lens surface of 0.07 when applied thereon as a single component was diluted, and thereby a Dip solution of 0.2% by concentration of solid content was prepared. As for a lens material, a plastic spectacle lens with a layer of hard coat film and an anti-reflection coating (the outermost layer is a $SiO_2$ film)

(Seiko Super Soverein, manufactured by Seiko Epson Corporation) was prepared and plasma treatment was applied to cleanse a surface thereof. The plasma treatment was carried out under the conditions of treatment pressure: 0.1 Torr, introduced gas: dry air, a distance between electrodes: 24 cm, output power: DC 1 KV, and a treatment time period: 15 sec.

A plasma-treated lens was immersed in the Dip treatment solution and held there for 1 min, followed by pulling up at 40 cm/min, further followed by putting in a constant temperature and constant humidity chamber set at 60 degree centigrade and 60% RH and holding there for 2 hr, and thereby a stain-proofing layer was formed.

COMPARATIVE EXAMPLE 2

In perfluorohexane, 0.1% by concentration of solid component of a silane compound A (trade name KY-130, manufactured by Shin-Etsu Chemical Co., Ltd.) that gives the dynamic friction coefficient of a lens surface of 0.07 when applied thereon as a single component, and 0.1% by concentration of solid component of a silane compound C (trade name Optool DSX, manufactured by Daikin Industries Ltd.) that gives the dynamic friction coefficient of a lens surface of 0.09 when applied thereon as a single component, were diluted, and thereby a solution of 0.2% by concentration of solid content was prepared as a treatment solution for Dip.

A ratio of the dynamic friction coefficients of the silane compound A and the silane compound C ((the highest value of the dynamic friction coefficient)/(the lowest value of the dynamic friction coefficient)) was 1.3.

As for a lens material, a plastic spectacle lens having a layer of hard coat film and an anti-reflection coating (the outermost layer is a $SiO_2$ film) (Seiko Super Soverein, manufactured by Seiko Epson Corporation) was prepared and plasma treatment was applied to cleanse a surface thereof. The plasma treatment was carried out under the conditions of treatment pressure: 0.1 Torr, introduced gas: dry air, a distance between electrodes: 24 cm, output power: DC 1 KV, and a treatment time period: 15 sec.

A plasma-treated lens was immersed in the Dip treatment solution and held there for 1 min, followed by pulling up at 40 cm/min, further followed by putting in a constant temperature and constant humidity chamber set at 60 degree centigrade and 60% RH and holding there for 2 hr, and thereby a stain-proofing layer was formed.

COMPARATIVE EXAMPLE 3

In a fluorine base solvent (trade name Novec HFE-7200, manufactured by Sumitomo 3M Co.), 0.04% by concentration of solid component of a silane compound A (trade name KY-130, manufactured by Shin-Etsu Chemical Co., Ltd.) that gives the dynamic friction coefficient of a lens surface of 0.07 when applied thereon as a single component, and 0.16% by concentration of solid component of a silane compound B (trade name KP-801, manufactured by Shin-Etsu Chemical Co., Ltd.) that gives the dynamic friction coefficient of a lens surface of 0.34 when applied thereon as a single component, were diluted, and thereby a solution of 0.2% by concentration of solid content was prepared as a treatment solution for Dip.

A ratio of the dynamic friction coefficients of the silane compound A and the silane compound B ((the highest value of the dynamic friction coefficient)/(the lowest value of the dynamic friction coefficient)) was 4.9. As for a lens material, a plastic spectacle lens having a layer of hard coat film and an anti-reflection coating (the outermost layer is a $SiO_2$ film) (Seiko Super Soverein, manufactured by Seiko Epson Corporation) was prepared and plasma treatment was applied to cleanse a surface thereof. The plasma treatment was carried out under the conditions of treatment pressure: 0.1 Torr, introduced gas: dry air, a distance between electrodes: 24 cm, output power: DC 1 KV, and a treatment time period: 15 sec.

A plasma-treated lens was immersed in the Dip treatment solution and held there for 1 min, followed by pulling up at 40 cm/min, further followed by putting in a constant temperature and constant humidity chamber set at 60 degree centigrade and 60% RH and holding there for 2 hr, and thereby a stain-proofing layer was formed.

Evaluation tests below were carried out on thus obtained stain-proofing spectacle lenses. Evaluated results are shown in Table 1.

(1) Measurement of the Dynamic Friction Coefficient

In measuring the dynamic friction coefficient, a digital friction coefficient measurement tester (manufactured by Sagawa Seisakusho Co., Ltd.) was used, and the dynamic friction coefficient between a lens (a plane table lens was used for measuring the dynamic friction coefficient) and a cotton cloth was measured. Measurement conditions were as follows.

Vertical load: 600 gf

Moving speed: 100 mm/min (2) Axis Deviation Test

Test method: This evaluation was performed by observing whether the axis deviation, caused by slip between a chuck part (a portion where the lens was fixed to a shaft of the edging machine) and a surface of the lens, occured or not when a lens was ground into a predetermined frame shape by use of an edging machine.

Firstly, a test lens was prepared and set to a lens fixing jig. At this time, in one with an astigmatism index, a astigmatism axis was fixed so as to be in a stipulated direction (for instance, 180°); and in one without the astigmatism index, a straight line going through an optical center of the lens was ruled, and this was fixed so as to be in a stipulated direction (for instance, 180°). A crab eye type frame, which is large in an aspect ratio, was prepared and used as a reference frame.

As shown in FIG. 2, a lens 1 was fixed to chucks 2, 3 of an edging machine (LE-8080, manufactured by NIDEK Co., Ltd.). The chucks 2, 3 pressed the lens so as to clamp the lens from both sides of an optical axis of the lens. A tip end of the chuck 2 presses a surface of the lens 1 via a lens fixing seal 4.

With the chucks 2, 3 fixed, a grinding stone 5 was used to apply the edging process based on the previous frame data. A lens after finishing the edging process was inserted into a reference frame and the deviation of the astigmatism axis was measured by use of a lens meter. In the case of a straight line going through an optical center of the lens being ruled, a deviation angle between the ruled line and a horizontal line going through an optical axis of the reference frame was measured.

Twenty lenses were edged and a ratio of ones in which the axis deviation exceeded an allowed range was calculated. The allowed range of the axis deviation was set at ±2° or less.

(3) Evaluation of Stain-Proofing Performance (Wiping Endurance Test by the Cotton Cloth)

Test method: A cotton cloth was reciprocated 5000 times on a convex surface of a lens under load of 200 g. The stain-proofing performance after the wiping endurance test was evaluated with a contact angle and the wiping properties of oily ink.

Evaluation (1): Measurement of Contact Angle

In measurement of the contact angle, a contact angle meter (trade name CA-D, manufactured by Kyowa Science Co., Ltd.) was used and a water contact angle was measured by a liquid drop method.

Evaluation (2): Oily Ink Wiping Performance

On a convex surface of a lens, a straight line of substantially 4 cm was written with a black oily marking pen (Hi-Mackee Care, manufactured by Zebra Co., Ltd.), followed by leaving for substantially 5 min. After leaving such a time, the marked portion was wiped with a wipe paper (Kaydry, manufactured by Crecia Corp.) and the easiness of wiping was evaluated according to criteria below.

○: completely removed by wiping 10 times or less.

Δ: completely removed by wiping 11 to 20 times.

X: incapable of completely removing even by wiping 20 times.

to an extent that allows applying the edging process, but the stain-proofing effect intrinsic to the fluorine-containing compound is deteriorated.

From the above, it is confirmed that a spectacle lens on which a stain-proofing layer is formed with two or more kinds of silane compounds that are selected so as to be different in the dynamic friction coefficient after treatment and includes at least one or more kinds of fluorine-containing silane compounds, can reduce the slipperiness of a lens surface to an extent that allows applying edging process without deteriorating the stain-proofing effect.

INDUSTRIAL APPLICABILITY

The present invention can be applied to stain-proofing spectacle lenses; however, it is not restricted to the above.

TABLE 1

| | Ratio of dynamic friction coefficients*1 | Dynamic friction coefficient | Incidence rate of axis deviation % | Wiping endurance (contact angle) | | Wiping endurance (wiping performance) | | Overall evaluation |
|---|---|---|---|---|---|---|---|---|
| | | | | Initial | After endurance test | Initial | After endurance test | |
| Embodiment1 | 4.9 | 0.08 | 0 | 105 | 104 | ○ | ○ | ○ |
| Embodiment2 | 4.9 | 0.18 | 0 | 101 | 97 | ○ | ○ | ○ |
| Embodiment3 | 3.8 | 0.12 | 0 | 106 | 102 | ○ | ○ | ○ |
| Embodiment4 | 5.3 | 0.18 | 0 | 101 | 94 | ○ | ○ | ○ |
| Embodiment5 | 5.3 | 0.15 | 0 | 102 | 99 | ○ | ○ | ○ |
| Embodiment6 | 4.9 | 0.08 | 0 | 110 | 104 | ○ | ○ | ○ |
| Comparative Example 1 | — | 0.07 | 90 | 106 | 104 | ○ | ○ | X |
| Comparative Example 2 | 1.3 | 0.09 | 95 | 111 | 108 | ○ | ○ | X |
| Comparative Example 3 | 4.9 | 0.22 | 0 | 107 | 102 | Δ | ○ | X |

*1 A value of (the highest dynamic friction coefficient)/(the lowest dynamic friction coefficient) of surfaces when each of two or more kinds of silane compounds is formed as a single component.

From the results of Table 1, on each of spectacle lenses (embodiments 1 through 6), a stain-proofing layer is formed with two or more kinds of silane compounds that are selected so as to be different in the dynamic friction coefficient after treatment, and includes at least one or more kinds of fluorine-containing silane compounds. When compared these embodiments 1 through 6 with a spectacle lens (comparative example 1) on which a stain-proofing layer is formed only with a fluorine-containing silane compound that is low in the dynamic friction coefficient when formed as a single component and can give a lens surface high in the slipperiness, or a spectacle lens (comparative example 2) on which a stain-proofing layer is formed, in which a ratio of the highest value of the dynamic friction coefficients to the lowest value of the dynamic friction coefficients is 1.4 times or less, these embodiments 1 through 6 are substantially the same in the stain-proofing effect and the durabilityon one hand and remarkably reduced in the incidence rate of the axis deviation on the other hand.

Furthermore, in a spectacle lens (comparative example 3) on which a stain-proofing layer is formed from silane compounds in which a content of a silane compound that is low in the dynamic friction coefficient of a lens surface when formed as a single component and high in the slipperiness of the lens surface is less than 30% by weight of a total amount of the silane compounds, the surface slipperiness is lowered

The invention claimed is:

1. A stain-proofing spectacle lens, comprising:
   a stain-proofing layer formed on a surface of the spectacle lens with two or more kinds of silane compounds including at least one or more kinds of fluorine-containing silane compounds;
   wherein dynamic friction coefficients of lens surfaces, defined by each of the two or more kinds of silane compounds as a single component, a highest dynamic friction coefficient value is 1.4 times or more of a lowest dynamic friction coefficient value.

2. The stain-proofing spectacle lens according to claim 1:
   wherein, among two or more kinds of the silane compounds, a content of a silane compound that gives a surface lowest in the dynamic friction coefficient is in the range of 30 to 99% by weight relative to a total amount of silane compounds.

3. The stain-proofing spectacle lens according to claim 1:
   wherein the dynamic friction coefficient of a lens surface that is formed with a silane compound that gives the lowest dynamic friction coefficient among two or more kinds of silane compounds as a single component is 0.2 or less.

4. The stain-proofing spectacle lens according to claim 1:
   wherein, among two or more kinds of the silane compounds, at least one kind is expressed with a general formula (1) below

[Formula 1]

(1)

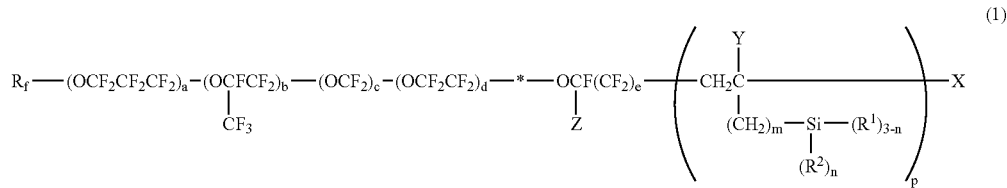

(In the formula, $R_f$ expresses a straight chain or a branched chain perfluoroalkyl group having 1 to 16 carbon atoms; X, an iodine atom or a hydrogen atom; Y, a hydrogen atom or a lower alkyl group; Z, a fluorine atom or a trifluoromethyl group; $R^1$, a hydrolizable group; $R^2$, a hydrogen atom or an inactive monovalent organic group; a, b, c and d, an integer of 0 to 200; e, 0 or 1; m and n each, an integer of 0 to 2; and p, an integer of 1 to 10).

5. The stain-proofing spectacle lens according to any one of claims 1 through 4:
wherein an anti-reflection coating is formed as for a lower layer of the stain-proofing layer of the stain-proofing spectacle lens.

6. A method of manufacturing a stain-proofing spectacle lens, comprising:
a step of forming an antireflection coating on a surface of a lens base material on which a hard coat film may be formed; and
a step of forming a stain-proofing layer, from two or more kinds of silane compounds including at least one kind or more of fluorine-containing silane compounds, on the antireflection coating;
wherein dynamic friction coefficients of lens surfaces, defined by each of the two or more kinds of silane compounds as a single component, a highest dynamic friction coefficient value is 1.4 times or more a lowest dynamic friction coefficient value.

7. The method of manufacturing a stain-proofing spectacle lens according to claim 6,
wherein a treatment agent containing the two or more kinds of the silane compounds is coated on a lens surface in the step of forming a stain-proofing layer from two or more kinds of silane compounds including at least one or more kinds of fluorine-containing silane compounds on the antireflection coating.

8. The method of manufacturing a stain-proofing spectacle lens according to claim 6:
wherein two or more kinds of the silane compounds are evaporated in a vacuum chamber and stuck on a lens surface in the step of forming a stain-proofing layer from two or more kinds of silane compounds including at least one or more kinds of fluorine-containing silane compounds on the antireflection coating.

* * * * *